(12) United States Patent
Wakayama (10) Patent No.: US 7,439,665 B2
(45) Date of Patent: Oct. 21, 2008

(54) FLAT DISPLAY PANEL AND METHOD OF DIVIDING THE FLAT DISPLAY PANEL (75) Inventor: Haruo Wakayama, Suita (JP)

(73) Assignee: Mitsuboshi Diamond Industrial Co., Ltd., Osaka (JP)

( * ) Notice: Subject to any disclaimer, the term of this patent is extended or adjusted under 35 U.S.C. 154(b) by 126 days.

(21) Appl. No.: 10/483,125

(22) PCT Filed: Jul. 12, 2002

(86) PCT No.: PCT/JP02/07086

§ 371 (c)(1),
(2), (4) Date: Jun. 16, 2004

(87) PCT Pub. No.: WO03/006391

PCT Pub. Date: Jan. 23, 2003

(65) Prior Publication Data
US 2004/0245913 A1 Dec. 9, 2004

(30) Foreign Application Priority Data
Jul. 12, 2001 (JP) ............................. 2001-212169

(51) Int. Cl.
H01J 1/62 (2006.01)
H01J 63/04 (2006.01)
H01J 9/00 (2006.01)
(52) U.S. Cl. ...................... 313/493; 313/512; 313/506; 445/24
(58) Field of Classification Search ................. 313/493
See application file for complete search history.

(56) References Cited
U.S. PATENT DOCUMENTS
6,901,670 B2 * 6/2005 Wakayama et al. .......... 33/18.1
7,015,118 B2 * 3/2006 Wakayama ................. 438/460
2004/0040997 A1 * 3/2004 Ueyama et al. ............ 225/96.5

FOREIGN PATENT DOCUMENTS
JP 55-015173 2/1980
JP 56-067819 6/1981
JP 56-091216 7/1981

(Continued)

OTHER PUBLICATIONS
English translation of JP 11-084334A (Takasaki, Ichiro).*

Primary Examiner—Nimeshkumar D. Patel
Assistant Examiner—Natalie K Walford
(74) Attorney, Agent, or Firm—Wenderoth, Lind & Ponack, L.L.P.

(57) ABSTRACT

In a flat display panel wherein two plates made of a brittle material are adhered to each other, at least one of the two plates has a plane on which a scribing line is formed, and the plane of the at least one of the plates on which a scribing line is formed is opposed to a plane of the other of the at least one of the two plates on which no scribing line is formed. In one case, the two plates have planes on which scribing is performed, while in another case, only one of the two plates has a plane on which scribing is performed. In the latter case, scribing may be performed on the other of the two plates after the two plates are adhered.

10 Claims, 9 Drawing Sheets

FOREIGN PATENT DOCUMENTS

| | | |
|---|---|---|
| JP | 57-63247 | 4/1982 |
| JP | 59-19925 | 2/1984 |
| JP | 2-56650 | 11/1990 |
| JP | 5-39890 | 6/1993 |
| JP | 6-3638 | 1/1994 |
| JP | 7-218883 | 8/1995 |
| JP | 07-218883 | 8/1995 |
| JP | 10-301074 | 11/1998 |
| JP | 11-84334 | 3/1999 |
| JP | 2000-241822 | 9/2000 |
| JP | 2000-249999 | 9/2000 |
| JP | 2000249999 A * | 9/2000 |
| KR | 1991-0003298 | 1/1991 |

* cited by examiner

Fig.1

PRIOR ART

SCRIBE AFTER ADHERING THEM TOGETHER

FLAT DISPLAY PANEL AND METHOD OF DIVIDING THE FLAT DISPLAY PANEL

TECHNICAL FIELD

The present invention relates to a flat display panel such as a liquid crystal panel having two plates adhered to each other, and a method for separating the panel into parts.

BACKGROUND ART

Flat display panels such as a liquid crystal display panel, a panel of a liquid crystal projector, an organic electroluminescence element and the like are used in various areas for communication between a machine and a man. Various electronic controller circuits necessary for a display function are formed on inner surfaces of two plates made of a brittle material or brittle materials, and opposed to each other. The two plates are adhered to each other in a fabrication process of such a flat display panel. The electronic controller circuits control a functional material sealed in a space between the two plates, and the panel is used as a display apparatus to display a visible image.

A prior art fabrication process of a liquid crystal panel as one of flat display panels is explained here. It is to be noted that separation of plates made of a brittle material, such as glass plates, into a plurality of parts is referred to as a "separating" or "breaking" in the art. Hereinafter, a "separating" step is referred to as a step after scribing until division into a plurality of panels.

Figure 1:
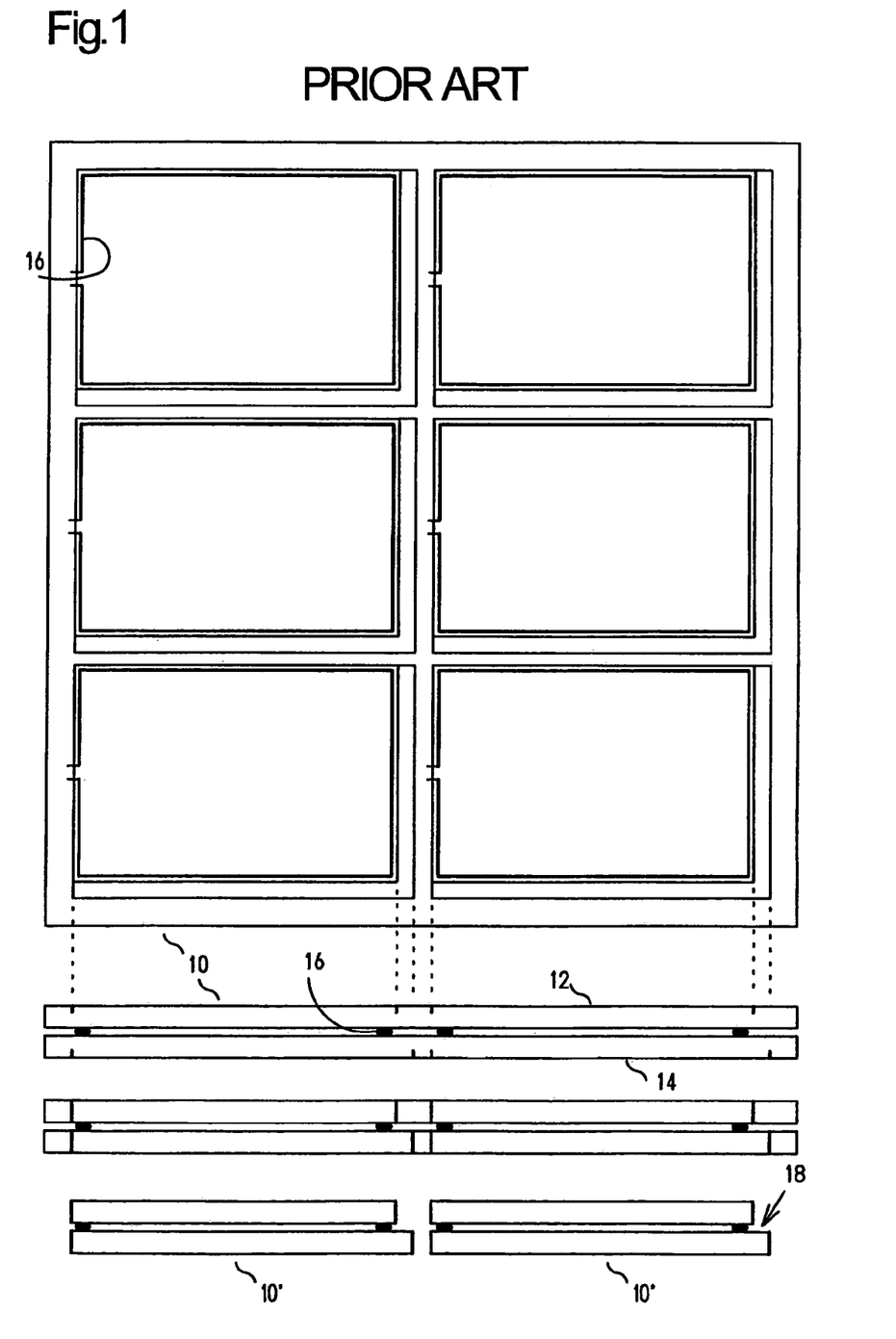
FIG. 1 is a diagram for explaining a structure of a prior art liquid crystal panel.

As shown in FIG. 1, in the fabrication of a liquid crystal panel 10, which is a kind of a flat display panel, two glass plates 12, 14 are adhered to each other with a sealant 16. Scribing lines are typically formed on the two glass plates of the liquid crystal panel 10 of a large size (or mother panel), and a force is applied along the scribing lines. Thus, as the force is applied, vertical cracks extend along a thickness direction from the scribing lines consisting of vertical cracks to separate the mother panel (the liquid crystal panel 10) into a plurality of liquid crystal panels 10'. Further, a terminal 18 used as a terminal of a thin film transistor (TFT) array is formed on the glass plate 14. The sealant 16 is shown with an exaggerated size in the cross sections shown in the lower side in FIG. 1, in order to show the positions of the sealant 16 clearly.

Figure 2:
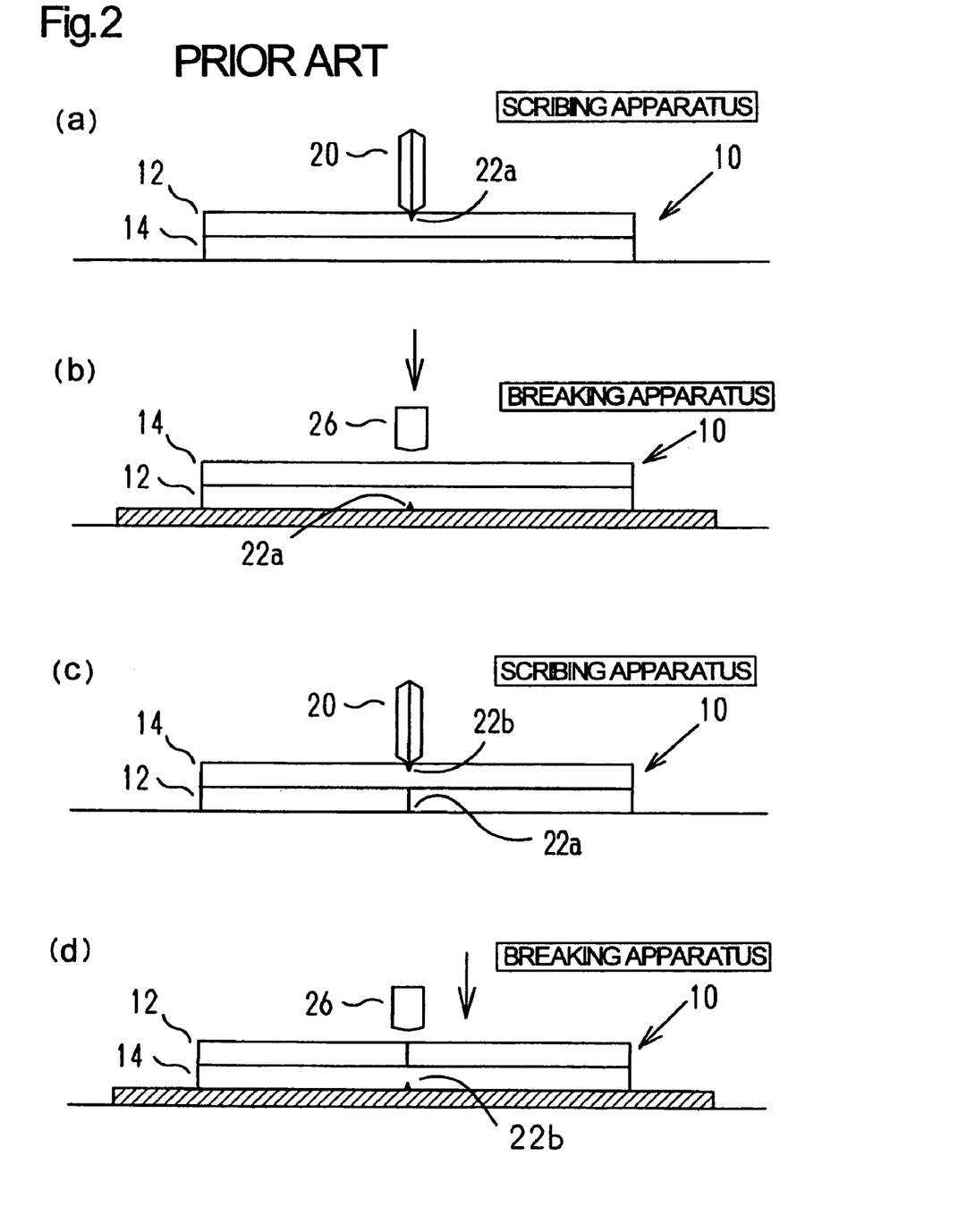
FIG. 2 is a diagram for explaining separating processes of the prior art liquid crystal panel.

FIG. 2 shows separating steps (a) to (d) of a liquid crystal panel 10. In order to separate to the liquid crystal panel 10 into liquid crystal panels 10', two separating steps and two inversion steps are necessary.

(a) By using the scribing apparatus, a scribing line 22a is formed with a glass cutter wheel 20 on one of the glass plates 12.

(b) The liquid crystal panel 10 is carried to a first breaking apparatus by turning the panel upside down. In the breaking apparatus, a breaking bar 26 is pressed down onto the other of the glass plates 14 at the position of the scribing line 22a to break the lower glass plate 12 along the scribing line 22a.

(c) Next, the liquid crystal panel 10 having the lower glass plate 12 which is already broken is carried to a second scribing apparatus. In the second scribing apparatus, a scribing line 22b is formed with a glass cutter wheel 20 on the other glass plate 14.

(d) Next, the liquid crystal panel 10 is carried to the second breaking apparatus by turning the panel upside down. In the second breaking apparatus, a breaking bar 26 is pressed down onto the other of the glass plates 12 at the position of the scribing line 22b to break the lower glass plate 14 along the scribing line 22b. Thus, the liquid crystal panel 10 is separated into two.

Previously, in a fabrication process for a liquid crystal panel 10, the scribing is performed for the two glass plates 12, 14 after the two glass plates are adhered to each other. Then, as shown in step (c), the scribing is performed on the lower plane of the glass plate 12 and on the upper plane of the glass plate 14. Therefore, the direction of a bending moment given to the liquid crystal panel in the separating step is different between the glass plates 12 and 14. Therefore, the two glass plates cannot be broken at the same time. Therefore, after scribing on the glass plate 12 at step (a), the liquid crystal panel 10 is inverted, and the scribing on the other glass plate 14 is performed. Therefore, two cutting steps and two inversion steps are necessary. Thus, the process of the separation with the apparatus becomes long, and the system structure is large. Further, in the breaking step (d) for the glass plate 14, if the force becomes too large to generate defects in the cross section generated by separating the glass plates 12 and 14 into parts, this decreases the value of the products.

SUMMARY OF THE INVENTION

An object of the invention is to provide a simpler separation method of a flat display panel with two plates made of a brittle material or brittle materials, the two plates being adhered to each other, and flat display panels produced by the method.

A flat display panel according to the invention includes two plates made of a brittle material or brittle materials, and adhered to each other. At least one of the two plates has a plane on which a scribing line is formed, and the plane of the at least one of the plates on which a scribing line is formed is opposed to a plane of the other of the at least one of the two plates on which no scribing line is formed. In one case, the two plates have planes on which scribing is performed, while in another case, only one of the two plates has a plane on which scribing is performed. In the latter case, scribing may be performed on the other of the two plates after the two plates are adhered.

In a separation method according to the invention, at least one of two plates made of a brittle material or brittle materials is scribed. Next, the two plates are adhered to each other so that the plane of the at least one of the two plates on which scribing is performed opposes a plane of the other of the at least one of the two plates on which no scribing is performed. Further, the other of the at least one of the two plates is scribed if scribing has not yet been performed thereon. The adhered two plates are bent like an inverted-V-character if the planes on which scribing is performed are positioned at the upper side, or like a V-character if the planes on which scribing is performed are positioned at the lower side. Thus, the two plates are separated at the same time.

An advantage of the invention is that the fabrication process can be simplified without decreasing the value of the products.

DETAILED DESCRIPTION OF THE INVENTION

Embodiments of the invention will be explained below with reference to the appended drawings.

Figure 3:
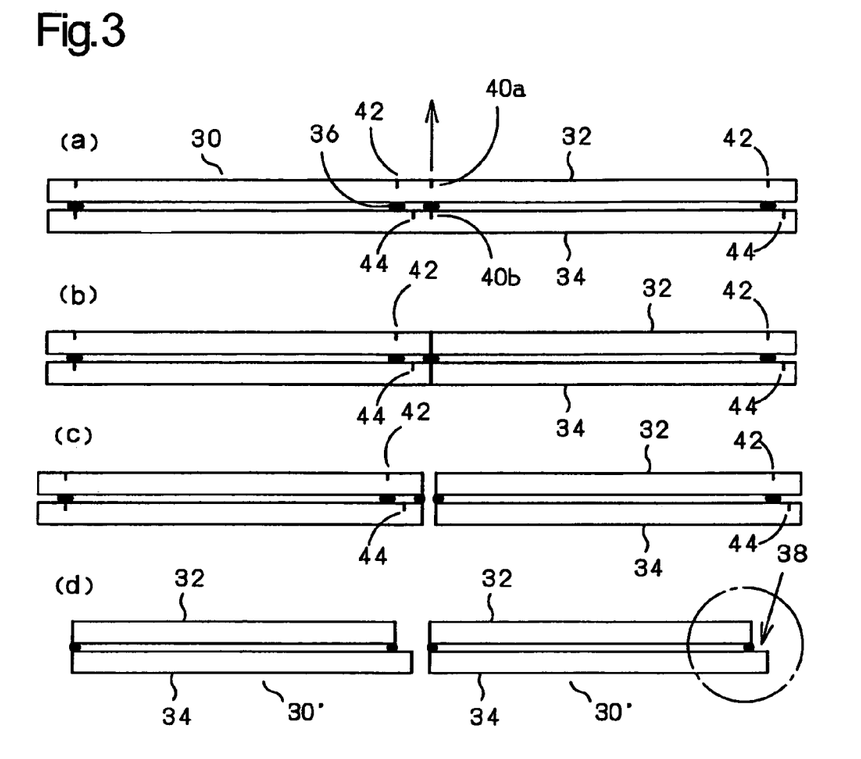
FIG. 3 is a diagram for explaining separating processes of a liquid crystal panel according to the invention.

FIG. 3 illustrates a producing method of liquid crystal panels as a kind of flat display panel according to the invention. A liquid crystal panel 30 of a large size is fabricated by adhering two opposing glass plates 32, 34 with a sealant 36. Various electronic controller circuits such as a thin-film-transistor (TFT) array necessary for the display function are formed on the inner planes of the glass plates 32, 34. A part of the sealant 36 has an opening between the glass plates 32, 34 for introducing a functional material (that is, liquid crystal). Further, a terminal part 38 is formed on the glass plate 34 and it will become a terminal of the TTF array. This structure of liquid crystal panel is the same as the prior art shown in FIG. 1.

Similar to the prior art shown in FIG. 2, a scribing line 40a is formed on a top plane of the glass plate 32 at the upper side. Further, a scribing line 40b is formed not on a bottom plane, but on the top plane of the glass plate 34. Thus, the scribing lines 40a, 40b are formed on the top planes of the two glass plates 32, 34. Further, the sealant 36 is located just below the scribing line 40a and just above the scribing line 40b, and this is also different from the prior art shown in FIG. 1.

In order to separate such a liquid crystal panel into parts, a bending force is applied to the two glass plates 32, 34 in the same direction (e.g., upward direction in FIG. 3). Then, the two glass plates 32 and 34 can be separated at the same time in one separating step.

In FIG. 3, reference marks (a) to (d) show steps for fabricating a liquid crystal panel. At step (a), a liquid crystal panel 30 is bent at scribing lines 40a, 40b. Then, as shown in step (b), vertical cracks extend from scribing lines 40a, 40b through the two glass plates 32, 34. Thus, as shown in step (c), the liquid crystal panel 30 is separated into two. As to scribing lines 42, 44 formed near the center or near an end on the liquid crystal panel, the relevant portions are also removed with a method mentioned above or with a prior art method. Thus, as shown in step (d), liquid crystal panels 30' are produced.

Figure 4:
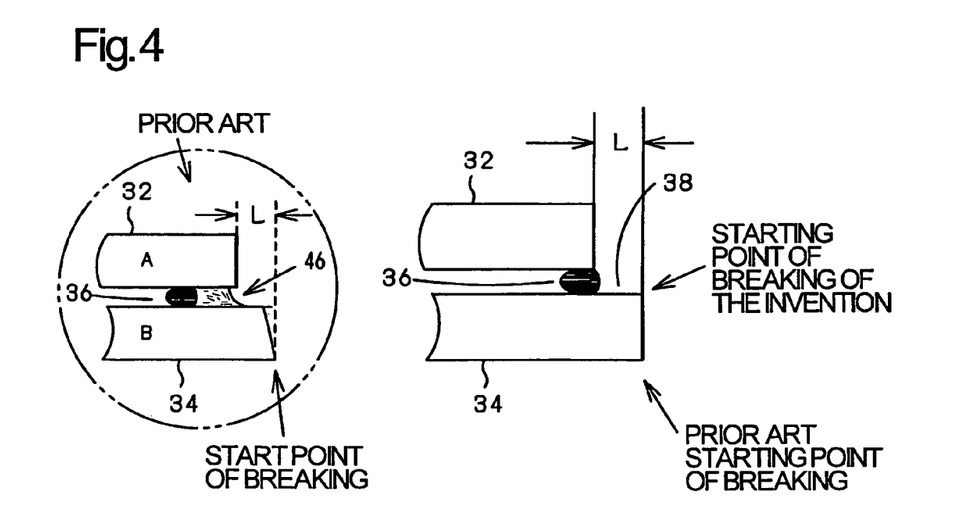
FIG. 4 is an enlarged view of a terminal portion in a liquid crystal panel.

FIG. 4 shows the terminal portion 38 of the liquid crystal panel 30' in an enlarged view. In the prior art method shown for comparison at the left-hand side in a circle of a two-dots-dash line, the starting point of breaking is positioned at the bottom plane of the lower glass plate 34. Since the breaking of the plate 34 does not necessarily progress vertically, the length L of the terminal at the terminal portion 38 is changed. On the contrary, in the liquid crystal panel of the invention, the starting point of breaking corresponds to the scribing line at the upper plane of the plate 34, and therefore, the length L of the terminal 38 can be kept almost the same.

Further, in the prior art method shown at the left side, the sealant 36 extends from the edge of the glass plate towards the inside (i.e., to the left side in FIG. 4). Then, washing water or the like remains at a void 46 near the end of the plate 32, which corrodes the terminal portion 38. On the other hand, in the liquid crystal panel according to the invention, because the sealant 36 is positioned just below the scribing position (separating position) of the upper glass plate 32, such a void does not exist, and washing water does not remain there.

Figure 5:
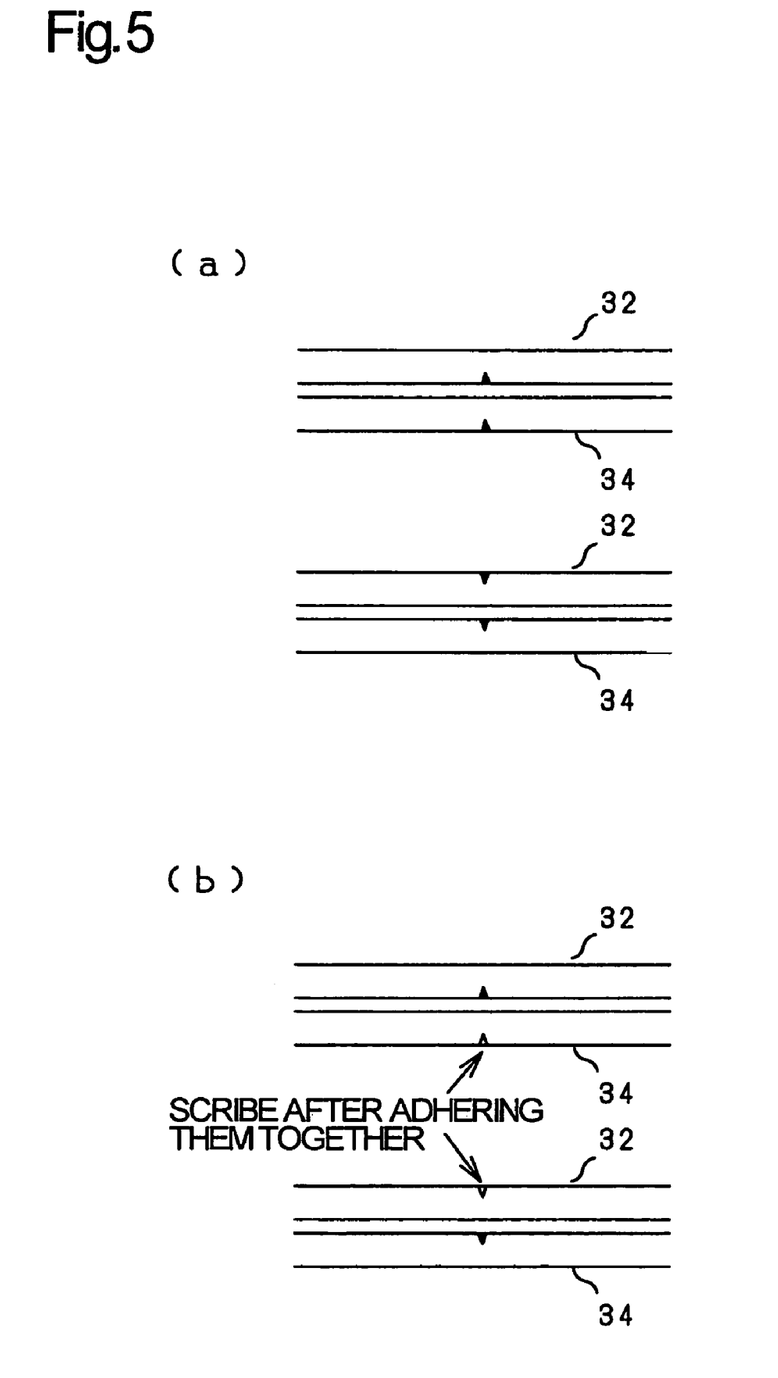
FIG. 5 is an enlarged view of the terminal portion in the liquid crystal panel.

In the liquid crystal display panel shown in FIG. 3, the two glass plates 32, 34 are adhered to each other after the scribing lines are formed. As shown in two examples in FIG. 5(a), the scribing lines are positioned at the same side (upper side or lower side). In another example, a scribing line is formed only on one of the two plates 32, 34. In this example, as shown with a solid line in two examples in FIG. 5(b), the scribed line is arranged inside the panel after the two plates are adhered, or it is not exposed to the outside. After the adhesion, a scribing line is formed on the other plate at the outside plane, as shown with dash line in FIG. 5(b). Even in this example, the two planes on which the scribing lines are formed are arranged at the same side (upper side or lower side).

Figure 6:
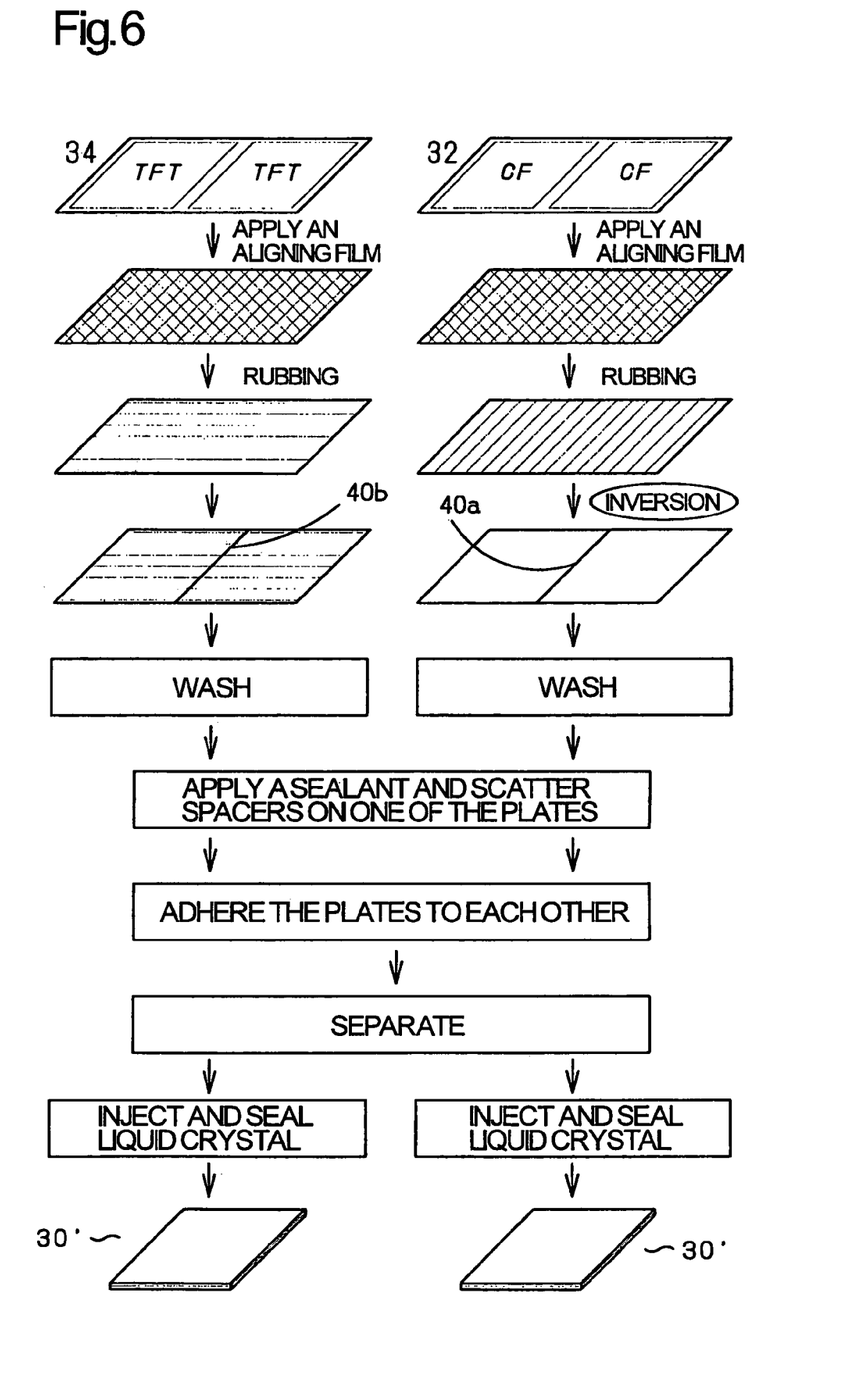
FIG. 6 is a flowchart of fabrication of a liquid crystal panel according to the invention.

A producing method of a liquid crystal panel is explained with a flowchart shown in FIG. 6, as an embodiment of a fabrication method of a flat display panel according to the invention. A glass plate 32 has two color filter regions on a plane thereof, and another glass plate 34 has two TFT array regions on a plane thereof. An aligning film is applied on these regions, and the aligning film is rubbed with a brush or the like in a predetermined direction. The rubbing makes liquid crystal align in the predetermined direction.

Next, a scribing line 40b is formed on the glass plate 34 with the aligning film thereon. On the other hand, after the glass plate 32 is turned upside down, another scribing line 40a is formed on the top plane. Scribing may be performed with a glass cutter wheel. Alternatively, the scribing line may be formed with a laser scribing apparatus which utilizes thermal distortion stress in a plate. Then, the two glass plates 32, 34 are washed. Next, a sealant 36 is applied to one of the glass plates on the aligning film to cover the scribing line in the vertical direction as mentioned above. Further, spacers are scattered on the aligning film of the one of the two glass plates.

Then, the two glass plates 32, 34 are adhered to each other so that the color filters oppose the TFT arrays. Then, the liquid crystal panel is separated into two with the separating method mentioned above. Then, liquid crystal is injected through an opening formed in the sealant 36 for each of the separated parts. By sealing the opening, liquid crystal panels 30' of product size are completed.

When the two glass plates 32, 34 are adhered to each other, the scribing line 40a is positioned at the top plane of the glass plate 32. Therefore, as to the glass plate 32, the scribing line may be formed after the adhesion.

In the above-mentioned process, as shown in FIG. 3, the top planes are scribed both for the glass plate 32 at the top side and for the other glass plate 34 at the bottom side. Alternatively, the scribing may be performed on the bottom planes. Further, the timing of the scribing is not limited to the step shown in FIG. 6. The scribing on one of the glass plates 32 or 34 with the aligning film thereon can be performed before adhering the glass plates 32, 34 as far as the scribing is not obstructed.

Next, a separation process appropriate for the invention is explained.

Figure 7:
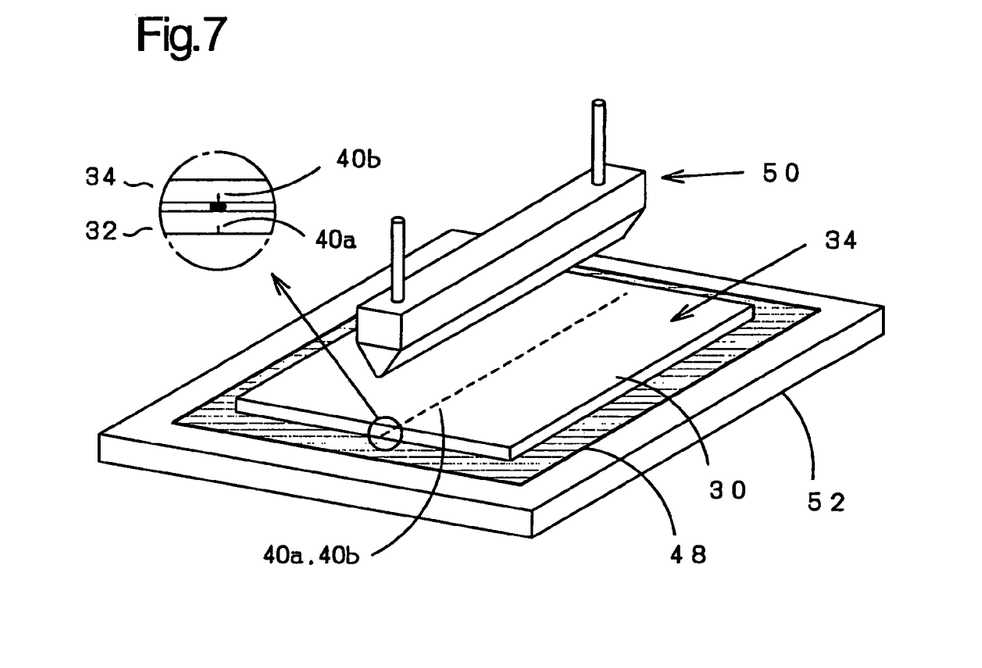
FIG. 7 is a perspective view of an example of a breaking apparatus suitable for breaking the liquid crystal panel.

A breaking apparatus shown in FIG. 7 has a known mechanism as the prior art breaking apparatus shown in FIG. 2. A liquid crystal panel having scribing lines 40a, 40b is set on a mat 48 placed on a table 52 so that the glass plate 34 is positioned at the upper side or the scribing lines 40a, 40b are positioned on the lower planes of the glass plates 32, 34. A breaking bar 50 is positioned above the scribing lines 40a, 40b. By pushing the breaking bar 50 downward, the liquid crystal panel 30 is bent on the mat 48 like a V-character to break the glass plates 32, 34 at the same time. The "bending like a V-character" means a state where the planes having the scribing lines (on the lower planes) are expanded while the other planes without scribing lines are compressed. Thus, a force is applied in a direction along which cracks at the scribing lines expand towards the opposing plane to separate the two glass plates 32, 34 into two.

Figure 8:
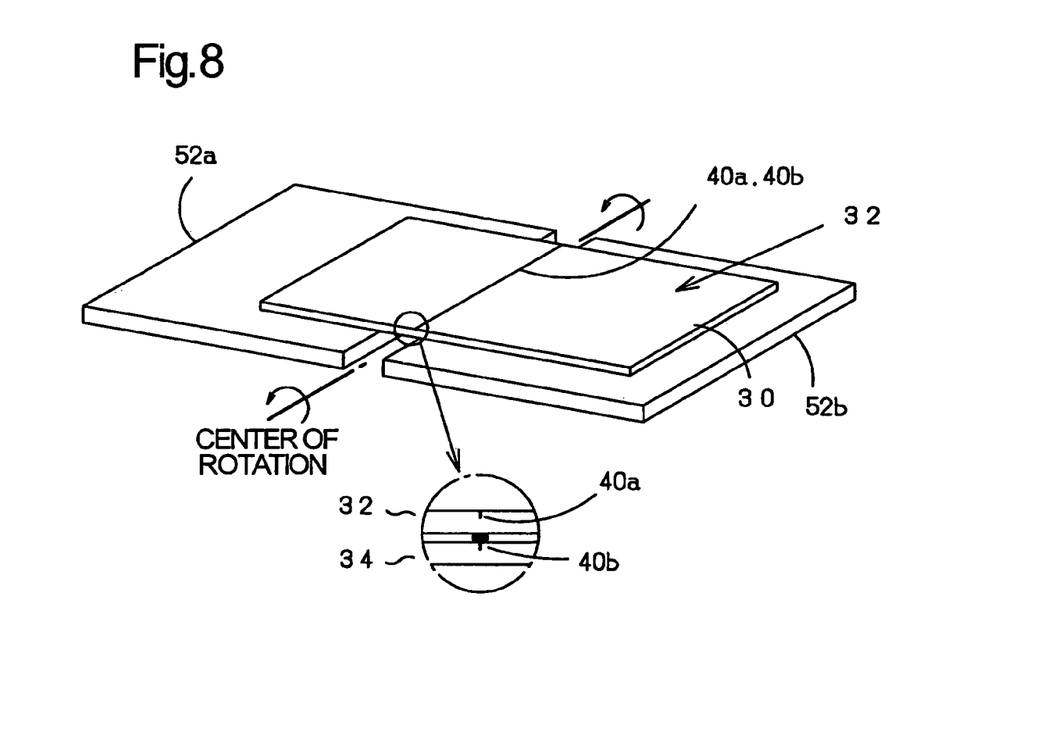
FIG. 8 is a perspective view of another example of a breaking apparatus suitable for cutting the liquid crystal panel.

FIG. 8 shows another breaking apparatus shown in Japanese Patent laid open Publication 4-280828/1992. Tables 52a and 52b are separated with a gap between them, and a liquid crystal panel 30 is sucked and fixed across the two tables 52a, 52b so that the scribing lines 40a, 40b are positioned in the gap. At this time, the glass plate 32 is set to be located at the upper side or the scribing lines 40a, 40b are positioned at the upper planes of the glass plates 32, 34. Then, one of the tables 52a is rotated around a center of rotation in a direction shown with an arrow. Thus, the liquid crystal panel is bent like an inverted-V-character to separate the two glass plates 32, 34 at the same time. The "bending like an inverted-V-character" means a state where the planes having the scribing lines (upper planes) are expanded while the other planes without scribing lines are compressed. In this case, a force is also applied in a direction along which cracks at the scribing lines expand towards the opposing plane so that the two glass plates 32, 34 are separated into two.

Figure 9:
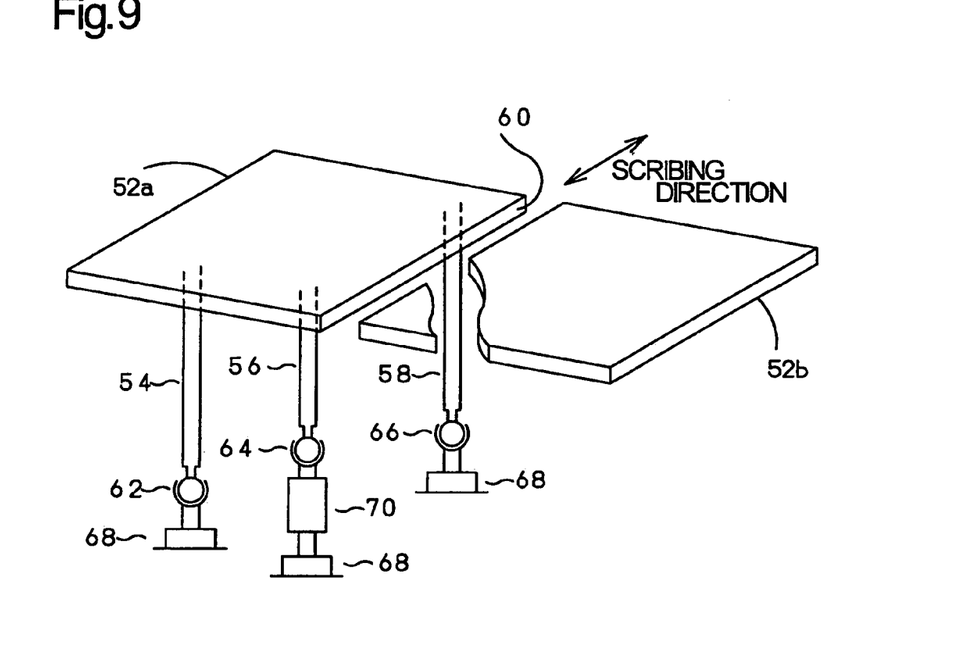
FIG. 9 is a perspective view of a further example of a breaking apparatus suitable for separating the liquid crystal panel into parts.

FIG. 9 shows a different breaking apparatus of the applicant on which a patent application was filed. The tables 52a and 52b are separated with a gap between them, and three supporting shafts 54, 56, 58 are fixed at the rear side of the table 52a vertically to the table plane. The supporting shafts 56, 58 are provided along a side 60 of the table 52a facing a gap between the two tables 52a, 52b, while the supporting shaft 54 is provided at a position opposing the supporting shaft 58 in a diagonal direction of the table.

A lower end of each supporting shaft 54, 56, 58 is connected to an end of a universal joint 62, 64, 66. The other end of the supporting shafts 62 and 66 are fixed to a base 68, while that of the supporting shaft 64 is fixed via an extension mechanism 70 to the base. The extension mechanism 70 has a linear motor or the like therein to extend in the vertical direction. Similar to FIG. 8, a liquid crystal panel 32 is sucked and fixed across the two tables 52a, 52b so that the glass plate is positioned at the upper side or the scribing lines 40a, 40b are positioned in the gap.

Figure 10:
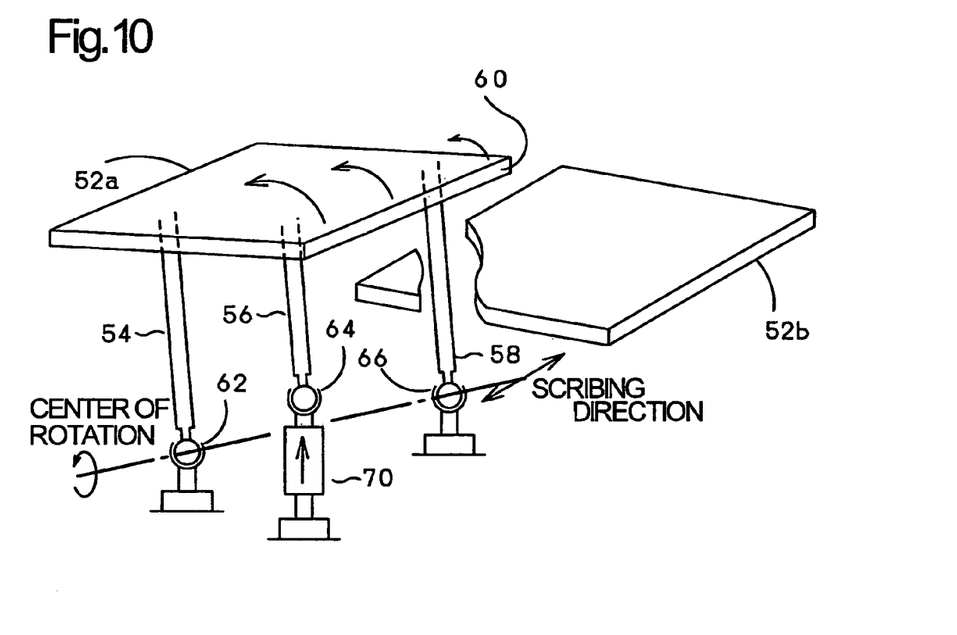
FIG. 10 is a diagram for explaining a separating operation in the breaking apparatus shown in FIG. 9.

FIG. 10 shows a state where the extension mechanism 70 is elongated. The table 52a is rotated with a center of rotation that corresponds to a line connecting the universal joints 62 and 66. However, the direction of the center of rotation has a certain angle relative to the scribing direction. Therefore, the amplitude of the movement of the end face 60 of the table 52a becomes larger as a position on the table is moved to the front side in FIG. 10, as shown with arrows. This tendency is enhanced as the angle becomes larger.

Thus, in the glass plates, the breaking is started at the end face at the front side, and the glass plate is separated from the front side to the rear side successively. In the separation process, the separation is started at a point so that a section generated by the separation is formed smoothly with a small breaking force. Therefore, the problems mentioned above in connection with prior art do not happen. Further, separation can be performed similarly for a glass plate for which scribing is performed with a laser scribing apparatus which uses thermal distortion stress.

Figure 11:
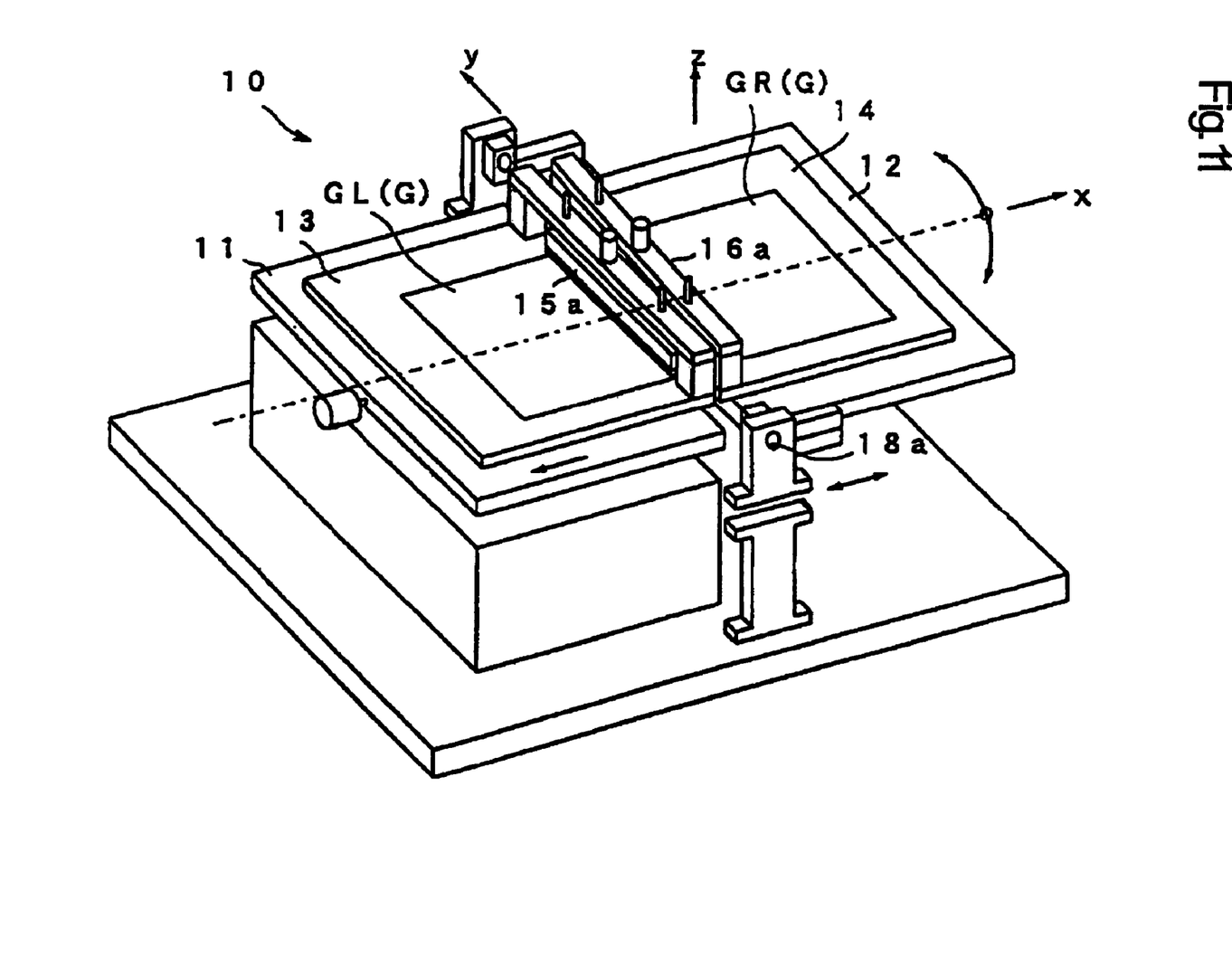
FIG. 11 is a perspective view of a still further example of a breaking apparatus suitable for separating the liquid crystal panel into parts.

FIG. 11 shows another breaking apparatus. In this apparatus, first and second product tables 13, 14 are set on a sliding table 11 and a tilt table 12 so that the edges of the tables 13, 14 make a predetermined angle. Plates G adhered to each other and having scribing lines (not shown) formed on two planes thereof are put on the tables 13, 14 and first and second clamp bars 15a, 16a press and fix the plates G. Then, the second product table 14 is rotated around a center axis of rotation 18a, so that a shear force and a tensile force are applied to the scribing lines with the clamp bars used as a pressing means. Therefore, one of the clamp bars 15a, 15b having a smaller gap acts as a breaking point for the plates G. Thus, the plates G are separated into two parts GR, GL.

Figure 12:
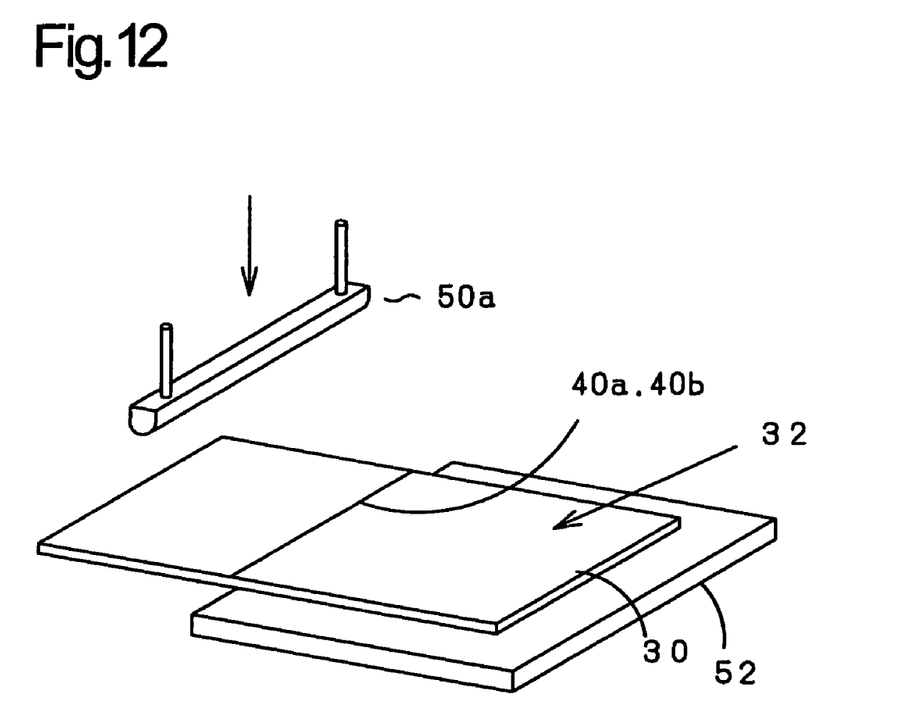
FIG. 12 is a perspective view of a different example of a breaking apparatus suitable for separating the liquid crystal panel into parts.

FIG. 12 shows a breaking apparatus for pressing an edge of a liquid crystal panel with a pressing device 50a. A liquid crystal panel 30 according to the invention can also be separated with the apparatus. In this example, similar to the apparatus shown in FIG. 8, the liquid crystal panel 30 is positioned on a table 52 so that one of the glass plates 32 is positioned at the upper side.

Further, it is to be noted that though the above-mentioned liquid crystal panel includes glass plates, the invention can be applied generally to a flat display panel including plates made of a brittle material or brittle materials.

Next, a producing method of a reflection type liquid crystal projector panel is explained according to a second embodiment of the invention. The reflection type liquid crystal projector panel is fabricated by adhering a silicon plate and a glass plate opposing each other with a sealant and by separating the adhered plates into parts. The separation step is similar to that of the first embodiment shown in FIG. 3, but is different only by replacing a glass plate at the lower side with a silicon plate. Therefore, a detailed explanation on the separating step is omitted here.

In the above-mentioned embodiments, a liquid crystal display panel and a reflection type liquid crystal projector panel are explained. Further, needless to say, the invention can also be applied to a transmission type liquid crystal projector panel, an organic electroluminescence element, a plasma display panel, a field emission display panel and the like.

As explained above, according to the invention, two plates made of a brittle material or brittle materials are adhered so that planes on which scribing lines are formed are both the top planes or bottom planes of the two plates.

Then, the force applied for separating the plates exerts to extend the cracks from the scribing lines. Thus, the two plates can be separated at the same time, and the working step in the producing process can be significantly simplified, while the value of the product is not decreased.

The invention claimed is:

1. A flat display panel comprising:
   a first plate and a second plate,
   wherein the first plate and the second plate are made of a brittle material or brittle materials and are adhered to each other with a sealant, the sealant forming a closed space between the first and second plates except at an opening in the sealant,
   wherein the first plate has an inner surface and an outer surface, wherein at least a portion of the inner surface of the first plate faces the closed space between the first and second plates formed by the sealant, wherein the second plate has an inner surface and an outer surface, wherein at least a portion of the inner surface of the second plate faces the closed space between the first and second plates formed by the sealant, wherein a scribing line is formed on the inner surface of the first plate, the scribing line being formed adjacent to and outside the closed space between the first and second plates formed by the sealant so that the first and second plates are adhered to each other to constitute the flat display panel even after breaking along the scribing line, wherein the inner surface of the second plate has no scribing line is formed thereon, and wherein the first plate and the second plate are adhered to each other such that the inner surface of the first plate on which the scribing line is formed directly opposes the inner surface of the second plate on which no scribing line is formed.

2. The flat display panel according to claim 1,
wherein the outer surface of the second plate does not oppose the first plate, and
wherein the outer surface of the second plate has a scribing line formed thereon.

3. The flat display panel according to claim 1, wherein the sealant is positioned adjacent to the scribing line on the inner surface of the first plate on which the scribing line is formed.

4. The flat display panel according to claim 1,
wherein the first and second plates are made of glass, and
wherein the flat display panel is a liquid crystal display panel.

5. The flat display panel according to claim 1,
wherein the first and second plates are made of glass, and
wherein the flat display panel is a liquid crystal projector panel.

6. The flat display panel according to claim 1,
wherein one of the first and second plates is a glass plate and the other of the first and second plates is a silicon plate, and
wherein the flat display panel is a liquid crystal projection panel.

7. A separation method for a flat display panel having a first plate and a second plate being made of a brittle material or brittle materials, the first plate having an inner surface and an outer surface, and the second plate having an inner surface and an outer surface, the separation method comprising:

forming a scribing line on the inner surface of the first plate, adhering the first and second plates to each other with a sealant, the sealant forming a closed space between the first and second plates except at an opening in the sealant, such that the inner surface of the first plate on which scribing has been performed directly opposes the inner surface of the second plate on which no scribing has been performed, the scribing line of the first plate being formed adjacent to and outside the closed space formed by the sealant so that the first and second plates are adhered to each other to constitute the flat display panel even after breaking alone the scribing line scribing the outer surface of the second plate adjacent to and outside the closed space formed by the sealant after adhering the first and second plates to each other; and bending the adhered first and second plates like an inverted-V-character if the inner surface of the first plate and the outer surface of the second plate on which scribing has been performed are positioned at an upper side of both of the first and second plates, or like a V-character if the surface of the first late and the outer surface of the second plate on which scribing has been performed are positioned at a lower side of both of the first and second plates, wherein at least a portion of the inner surface of the first plate faces the closed space between the first and second plates formed by the sealant, and wherein at least a portion of the inner surface of the second plate faces the closed space between the first and second plates formed by the sealant.

8. The flat display panel according to claim 1, wherein said first and second plates adhered to each other form a mother panel.

9. The flat display panel according to claim 1, wherein said first and second plates adhered to each other are capable of separating so as to form a plurality of panels, each of the plurality of panels being formed of a respective portion of the first and second plates adhered to each other, and each of the plurality of panels having a smaller size than a panel formed of said first and second plates before separating.

10. A separation method for a flat display panel having a first plate and a second plate being made of a brittle material or brittle materials, the first plate having an inner surface and an outer surface, and the second plate having an inner surface and an outer surface, the separation method comprising:

forming a scribing line on the inner surface of the first plate and forming a scribing line on the outer surface of the second plate;

adhering the first and second plates to each other with a sealant, the sealant forming a closed space between the first and second plates except at an opening in the sealant, such that the inner surface of the first plate on which scribing has been performed directly opposes the inner surface of the second plate on which no scribing has been performed, the scribing line of the first plate being formed adjacent to and outside the closed space formed by the sealant so that the first and second plates are adhered to each other to constitute the flat display panel even after breaking along the scribing line of the first plate; and bending the adhered first and second plates like an inverted-V-character if the inner surface of the first plate and the outer surface of the second plate on which scribing has been performed are positioned at an upper side of both of the first and second plates, or like a V-character if the inner surface of the first plate and the outer surface of the second plate on which scribing has been performed are positioned at a lower side of both of the first and second plates, wherein at least a portion of the inner surface of the first plate faces the closed space between the first and second plates formed by the sealant, and wherein at least a portion of the inner surface of the second plate faces the closed space between the first and second plates formed by the sealant.

* * * * *